H. PIEPER.
COIL RETAINER FOR DYNAMO ELECTRIC MACHINES.
APPLICATION FILED NOV. 12, 1917.

1,396,525.

Patented Nov. 8, 1921.
2 SHEETS—SHEET 1.

H. PIEPER.
COIL RETAINER FOR DYNAMO ELECTRIC MACHINES.
APPLICATION FILED NOV. 12, 1917.
1,396,525.
Patented Nov. 8, 1921.
2 SHEETS—SHEET 2.
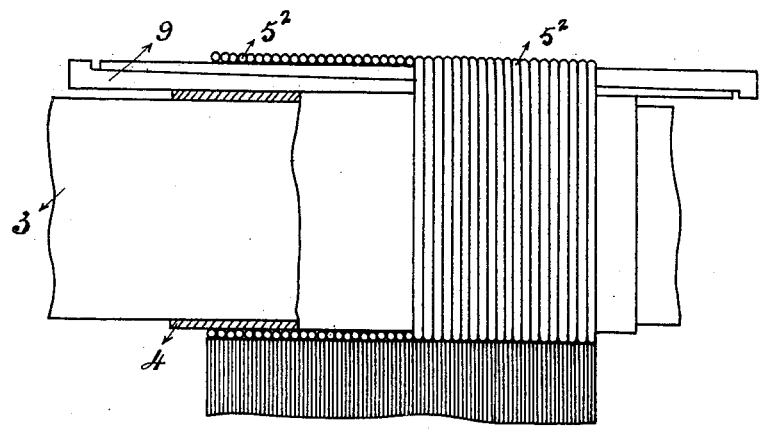
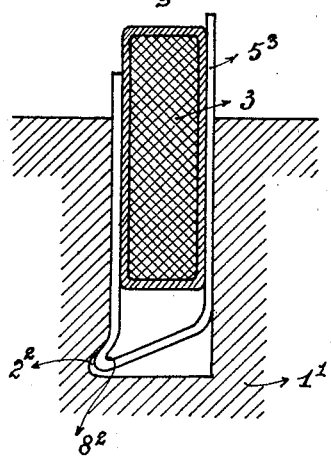
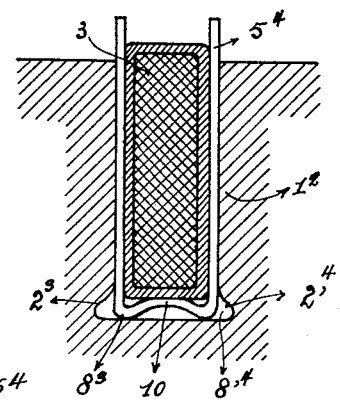
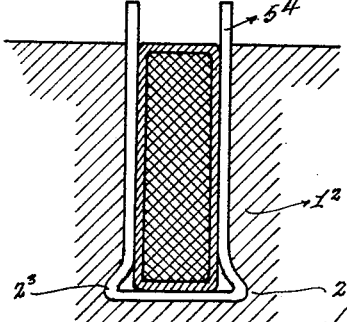

UNITED STATES PATENT OFFICE.

HENRI PIEPER, OF LIEGE, BELGIUM.

COIL-RETAINER FOR DYNAMO-ELECTRIC MACHINES.

1,396,525.          Specification of Letters Patent.      Patented Nov. 8, 1921.

Application filed November 12, 1917. Serial No. 201,691.

*To all whom it may concern:*

Be it known that I, HENRI PIEPER, manufacturer, a citizen of the Kingdom of Belgium, residing at Liege, 56 Quai de Fragnée, in Belgium, have invented certain new and useful Improvements in Coil-Retainers for Dynamo-Electric Machines, (for which I have filed an application in Germany August 28, 1916; Austria, August 20, 1917; Holland, (Netherlands,) August 28, 1917; and Hungary, August 31, 1917,) of which the following is a specification.

My invention has for its purpose to create for electric machines with open slots a rotor or stator winding having means to retain the coils in a sure manner against the action of the centrifugal force and at the same time obviating the magnetic and electric disadvantages of the open slots.

According to my invention the coils are retained in the open slots of rotors or stators by means of wires of magnetic or non-magnetic metal which are formed corresponding to the outline of the slot and inclosing the coil, a portion of each wire being forced into one or several notches in the walls of the slots.

Figure 1:
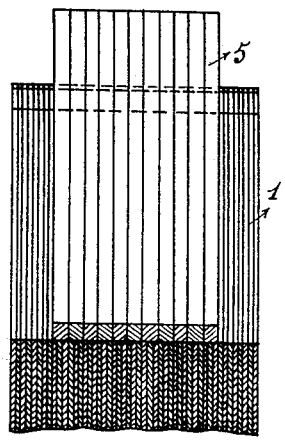
Figure 2:
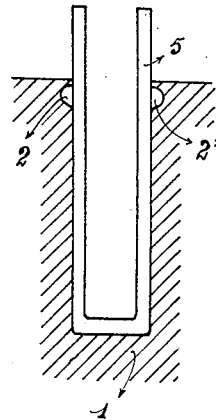
Figure 3:
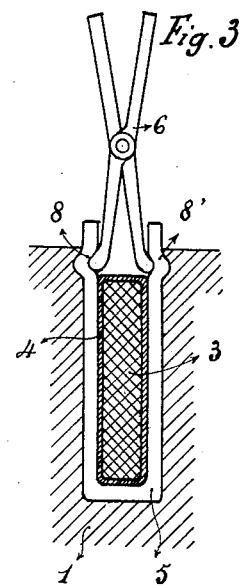
Figure 4:
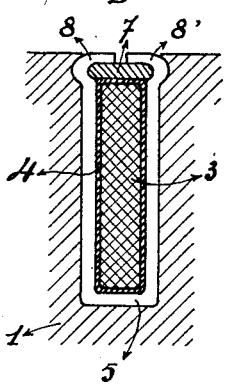
Figure 5:
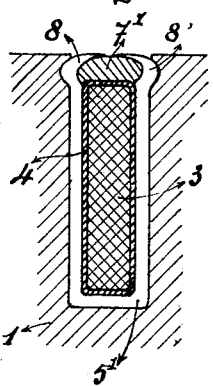
Figure 6:
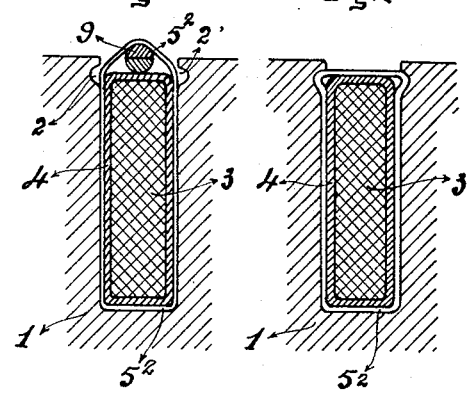
Figure 7:
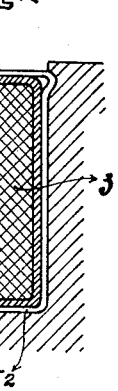

The drawing shows by way of example several modifications of my invention. Figures 1 to 4 represent the case where U-shaped wire pieces are used for fixing coils in open slots with notches situated near the mouth, the different figures illustrating the different steps of proceeding for placing the wire pieces into the slots and fixing them therein. Fig. 1 shows a longitudinal section of a part of an electric rotor taken through the middle of the notches. Fig. 2 gives the transversal section corresponding to Fig. 1. Figs. 3 and 4 illustrate transversal sections taken through the coil put in the rotor slot and provided with wire pieces. Fig. 5 represents a transversal section taken through a coil inclosed by wire pieces of modified form. Figs. 6 to 8 give a modification of my invention using a single wire as coil retainer, Figs. 6 and 7 being transversal sections of the coil equipped with the wire and Fig. 8 giving the corresponding longitudinal section of a rotor with coil and coil retainer. Fig. 9 shows in transversal section a modified form of a rotor slot with a single notch at the bottom and the corresponding U-shaped wire pieces. Figs. 10 and 11 illustrate in transversal section another modified form of rotor slot and wire piece, two notches being arranged in this case at the bottom of the slot.

According to Figs. 1 to 4 the slot 1 of a rotor or stator has the form of a normally open slot permitting the introduction of an insulating wedge, but the notches 2, $2^1$ are chosen smaller than as usual so that only a very reduced choking of the magnetic flux takes place in the tooth. The coil 3 is formed on suitable formers and provided with an insulating tube 4 before being introduced in the electric machine. The dimensions of the slot 1 are chosen so that the U-shaped wire pieces 5 can be inserted between the slot walls and the coil. These wire pieces 5 which, advantageously are lacquered or enameled are placed side by side in the slot 1 before introducing the coil 3, as shown in Fig. 1. After the introduction of the coil the branches of the U-shaped wire pieces 5 are forced by means of a suitable device 6—see Fig. 3—into the notches 2, $2^1$ so as to form the noses 8, $8^1$ filling up the notches. Finally the two ends of the wire pieces 5 are bent down to the coil 3 as shown in Fig. 4, an insulating plate 7 being firstly inserted between coils 3 and the ends of the pieces 5. The wire pieces 5 have such a length that a small interval exists between the ends, after they are bent down, so as to form a partly closed slot which is advantageous from the electrical standpoint. In order to take out a damaged coil 3 from the machine, it is sufficient to raise the ends of the wire pieces 5 by means of a suitable device so that the coil 3 can be drawn out.

The wire pieces 5 can be provided previously with two noses 8, $8^1$ corresponding to the notches 2, $2^1$ so as to have the form shown in Fig. 3 before being placed in the slot. These wire pieces can be easily introduced in the slot owing to their elasticity and after the introduction only their ends must be bent down to the coil.

In order to make as uniform as possible the variations of the magnetic flux in the air gap the wire pieces $5^1$ may be formed as shown in Fig. 5 so that the section of the ends decreases toward the middle of the slot. An insulating plate $7^1$ which has a section rounded off corresponding to the ends of the wires is inserted between the coils and the ends of the pieces before these ends are bent down.

Instead of employing several separate wire pieces, my invention can be realized also by using a single wire as coil-retainer means in the manner illustrated in Figs. 6 to 8. In this case a continuous metallic wire $5^2$ which may be lacquered, is wound spirally around the coil 3 before introducing the coil in the machine, an intermediate member 9 being inserted between the wire and the upper side of the coil. The coil 3 equipped with this wire is placed in the slot 1 and the intermediate member 9 is then drawn out. Then the part of the wire $5^2$ not yet touching the coil 3 is pressed down to the coil 3 and forced into the lateral notches 2, $2^1$ of the slot 1, so as to obtain the arrangement represented in Fig. 7. The intermediate member 9 may be composed of two parts so as to be removed more easily by drawing out a part on each side. Further the drawing out of the member 9 can take place not only after but also before the introduction of the coil.

Fig. 9 shows an embodiment of my invention in which one side only of the open slot is provided with a notch. According to Fig. 9 the slot $1^1$ has at the bottom a single lateral notch $2^2$. In conformity with this notch the U-shaped wire pieces $5^3$ are provided each with a single nose $8^2$ and an inclined middle part. The U-shaped wire piece $5^3$ is introduced in the slot and the inclined middle part is pressed down on the bottom of the slot by means of a suitable device or by the coil 3 itself whereby the nose $2^2$ is forced into the notch $8^2$. Finally the ends of the branches of the piece $5^3$ are bent down to the coil 3. As shown in Figs. 10 and 11 also two notches $2^3$, $2^4$ are provided at the bottom of the slot $1^2$, the U-shaped wire pieces $5^4$ each having two corresponding noses $8^3$, $8^4$ and a further nose 10 on its middle part. After the wire pieces $5^4$ have been placed in the slot $1^2$—see Fig. 10—a suitable device or the coil 3 itself is pressed against the middle parts of the wire pieces whereby the nose 10 is flattened against the bottom of the slot $1^2$, so that the noses $8^3$, $8^4$ are forced into the lateral notches $2^3$, $2^4$. Then the ends of the branches of the pieces $5^4$ are bent down to the coil.

As becomes clear from the foregoing constructions my invention constitutes a considerable advance in the art in comparison with the usual coil-retainers. On the one hand all the advantages of the open slots are realized, and, on the other hand, the drawbacks of such slots are avoided. The employment of armature bindings and of fixing wedges is not necessary and the coil can be placed as near as possible to the air gap. The notches of the slots can be reduced so as to diminish considerably the choking of the magnetic flux. The sudden variations of the magnetic flux due to the alternate succession of slots and teeth can be avoided by choosing correspondingly the section of the wire serving for retaining the coil. When a magnetic material is employed for the U-shaped wire pieces or the single spiral wire, the parts which are bent down to the coil constitute a path bridging over the mouth of the slot in the manner of a partly or completely closed slot so as to realize the advantages of such slot form. The section of the metallic wire can then be augmented and the breadth of the teeth may be reduced without diminishing the effective section of the teeth, because the omitted part of this section is compensated for by the wire section. Furthermore there are no supplemental electric losses due to the coil-retaining wire. The direction of the U-shaped wire pieces and of the windings of the spiral wire respectively is perpendicular to the direction of the eddy current traversing the coils so that injurious currents cannot be produced. Also the production of eddy currents can be prevented simply by insulating the wire windings or wire pieces one from the other in a suitable manner for instance by providing a cover of lacquer, enamel or silk, when a wire of magnetic material is used for the coil retainers.

The whole winding can be performed according to my invention in a very simple manner, because the coils can be made by means of appropriate formers and impregnated by a well known process before being introduced into the machine. At the same time the wire pieces or the spirally wound wire can be arranged on the coils, if it is desired to provide the coils with the coil-retainers before their introduction into the slots. The coils introduced are retained against the centrifugal or magnetic action in a sure and simple manner because the U-shaped wire pieces and the single spirally wound wire are maintained in place by their noses engaging the notches of the slots and inclose completely the coils.

Having now described and ascertained the nature of my said invention what I claim and desire to secure by Letters Patent is—

1. In a dynamo-electric machine the combination, with a cylindrical core member having open slots provided with notches near the periphery, of a form-wound coil inserted in said slots and of metallic wires inserted between the sides of said coil and the walls of said slots, said wires inclosing said coil and having small parts engaging with said notches for retaining said coil in said slots.

2. The combination with a core member of a dynamo-electric machine having form-wound coils and open slots provided with notches, of wire pieces U-shaped which are lodged between the coils and the slot walls, these wire pieces having portions engaging with the notches of the slots and the ends of the branches of the wire pieces bent down to the coils.

3. In a dynamo electric machine a core member having open slots provided with at least one notch near the periphery in combination with form-wound coils and wire pieces inserted between the coils and the slot walls, each of the wire pieces inclosing the coil and having a small part deformed so as to engage the notches of the slots.

4. In a dynamo electric machine the combination with a cylindrical core member having open slots provided with two notches one in each side of the slot wall, of form-wound coils and of wire pieces U-shaped and curved on a part corresponding to said notches parts of said wire pieces inserted in said notches and the ends of the branches of said wire pieces bent down against the coils.

5. In a dynamo electric machine in combination with a core member having open slots provided with notches form-wound coils and wire pieces U-shaped and provided with noses corresponding to said notches, the wire pieces in part inserted in the notches and bent over against the coils.

6. In a dynamo electric machine the combination with a core member having open slots provided with notches, of form-wound coils and of wire pieces of magnetic metal inclosing the coils and having small parts engaging with said notches.

7. In a dynamo electric machine the combination with a cylindrical core member having open slots provided with notches, of form-wound coils and of wire pieces of magnetic material U-shaped and inserted between the coils and the slot walls, and having small parts engaging with said notches, the ends of the branches of said pieces inclosing the coils.

8. In a dynamo electric machine in combination with a core member having open slots provided with notches, form-wound coils and wire pieces inserted between the coils and the slot walls and inclosing said coils, the wire pieces being of magnetizable material and having portions engaging with said notches.

9. In a dynamo electric machine the combination with a cylindrical core member having open slots provided with notches, of form-wound coils and of wire pieces inserted between the coils and the slot walls, said wire pieces having portions bent over the coils and other portions engaging with said notches.

In testimony whereof I affix my signature in presence of two witnesses.

HENRI PIEPER.

Witnesses:
  E. M. HEPTRO,
  J. LEONARD.